US011668960B2

(12) United States Patent
Belemans

(10) Patent No.: US 11,668,960 B2
(45) Date of Patent: Jun. 6, 2023

(54) CLEANING DEVICE FOR A PAIR OF SPECTACLES HAVING BAR-SHAPED CLEANING ELEMENTS

(71) Applicant: Specstaculr IP B.V., Kesteren (NL)

(72) Inventor: Jan Gèrald Belemans, Kesteren (NL)

(73) Assignee: SPECSTACULR IP B.V., Kesteren (NL)

( * ) Notice: Subject to any disclaimer, the term of this patent is extended or adjusted under 35 U.S.C. 154(b) by 0 days.

(21) Appl. No.: 17/295,077

(22) PCT Filed: Nov. 21, 2019

(86) PCT No.: PCT/NL2019/050765
§ 371 (c)(1),
(2) Date: May 19, 2021

(87) PCT Pub. No.: WO2020/106149
PCT Pub. Date: May 28, 2020

(65) Prior Publication Data
US 2022/0011605 A1    Jan. 13, 2022

(30) Foreign Application Priority Data
Nov. 23, 2018 (NL) ...................................... 2022059

(51) Int. Cl.
*G02C 13/00* (2006.01)
*B08B 1/00* (2006.01)
(Continued)

(52) U.S. Cl.
CPC ............ *G02C 13/006* (2013.01); *B08B 1/006* (2013.01); *B08B 1/008* (2013.01); *B08B 1/02* (2013.01); *B08B 11/02* (2013.01)

(58) Field of Classification Search
CPC ............................ G02C 13/006; A45C 11/043
See application file for complete search history.

(56) References Cited

U.S. PATENT DOCUMENTS 5,933,902 A    8/1999   Frey
5,988,910 A *  11/1999  Yahav .................. G02C 13/006
                                                       206/5.1
(Continued)

FOREIGN PATENT DOCUMENTS

CN    206714320    * 12/2017
DE    3025300 A1    1/1982
(Continued)

OTHER PUBLICATIONS

Translation of CN206714320 by Zhen-Rong Ye, published Dec. 8, 2017.*

*Primary Examiner* — Mikhail Kornakov
*Assistant Examiner* — Ryan L Coleman
(74) *Attorney, Agent, or Firm* — Browdy and Neimark, PLLC

(57) ABSTRACT

A cleaning device for a pair of spectacles, comprising a housing defining a cleaning space, a mounting part for holding the pair of spectacles inside said space, sets of opposing cleaning elements for cleaning opposing faces of glasses of the pair of spectacles, and a drive unit for moving the pair of spectacles and the cleaning elements relative to each other during a cleaning operation. The sets of opposing cleaning elements are positionable relative to each other between an inactive position, that is configured to have at least one of the sets of the cleaning elements lie spaced from at least one of the opposing faces of the respective glasses, and a cleaning position, that is configured to have the sets of opposing cleaning elements lie against both opposing faces of the respective glasses. Each of the cleaning elements is bar-shaped, wherein, in the cleaning position, longitudinal axis of the bar-shaped cleaning elements extend in one or more directions that are substantially parallel to the opposing faces of the glasses, and wherein the drive unit is configured to translate the pair of spectacles and the bar- (Continued)

shaped cleaning elements relative to each other substantially parallel to the opposing faces of the glasses while rubbing or wiping them clean.

28 Claims, 18 Drawing Sheets

(51) Int. Cl.
*B08B 1/02* (2006.01)
*B08B 11/02* (2006.01)

(56) References Cited

U.S. PATENT DOCUMENTS

| | | |
|---|---|---|
| 2007/0209135 A1 | 9/2007 | Chen et al. |
| 2011/0094537 A1 | 4/2011 | Ko et al. |
| 2013/0000671 A1 | 1/2013 | Wang et al. |
| 2018/0059411 A1 | 3/2018 | Schneider |

FOREIGN PATENT DOCUMENTS

| | | |
|---|---|---|
| EP | 0905748 A1 | 3/1999 |
| EP | 1189260 A1 | 3/2002 |

\* cited by examiner

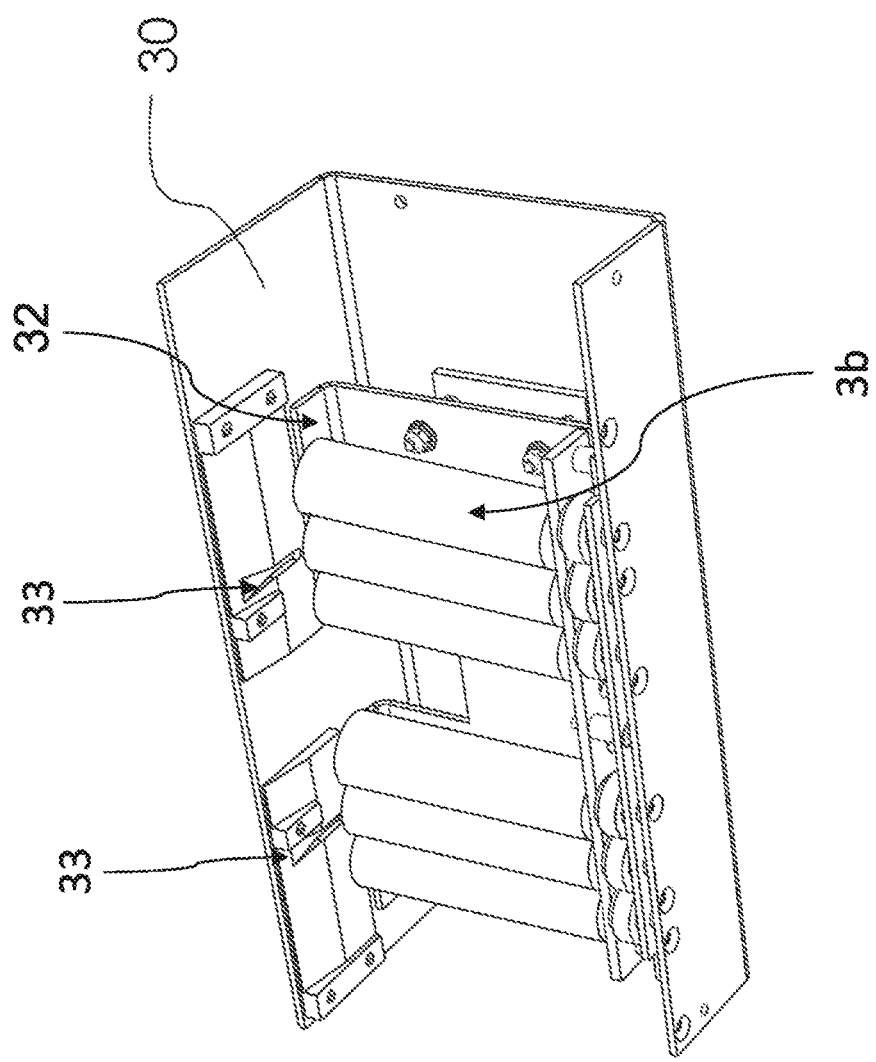

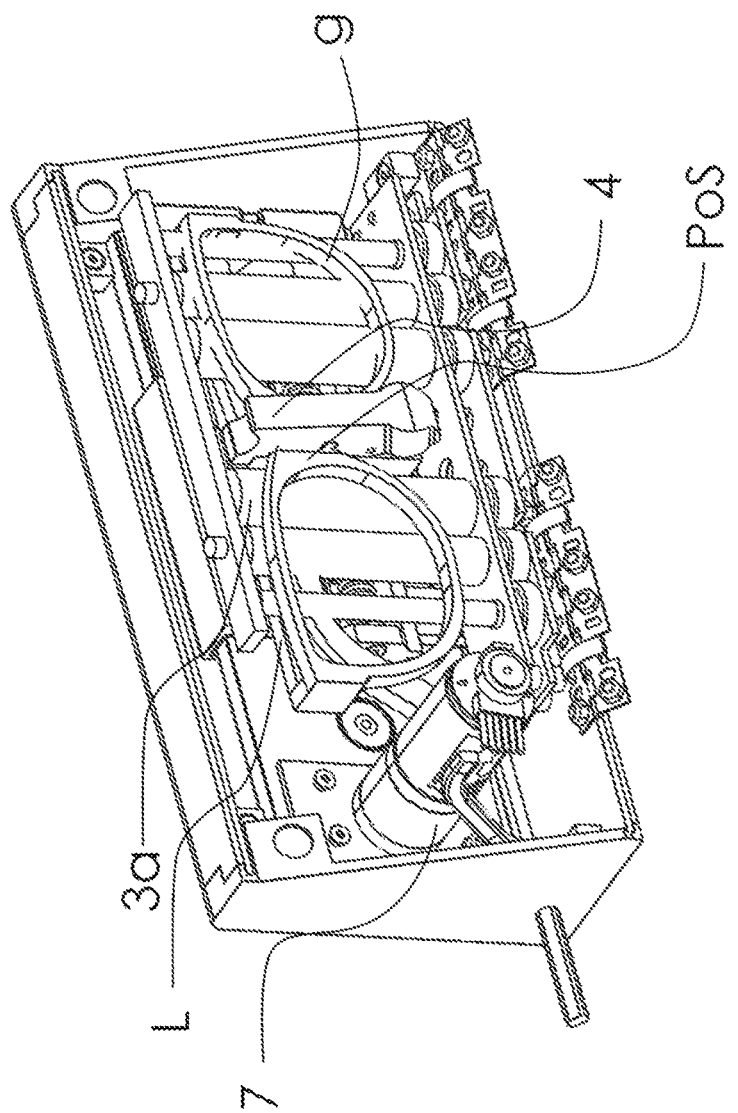

CLEANING DEVICE FOR A PAIR OF SPECTACLES HAVING BAR-SHAPED CLEANING ELEMENTS

The invention relates to a cleaning device for a pair of spectacles, in particular an automated one that is directly usable for wearers of such spectacles.

Such devices are already known since long in a wide variety of embodiments. However none of them seems to have become successfully commercially available. This may well have got to do with the so-called technological innovation gap, that is to say a transformation from a theoretical idea to actual practice.

For example DE 30 25 300, which is considered closest prior art from which the claims have been delimited, describes a device with two housing parts that are hingedly connected with each other. Inside the housing two opposing pairs of rotatable cleaning discs are provided that can be driven in rotation by means of an electromotor. With this, each housing part is provided with two adjacent ones of the cleaning discs in such a way that the cleaning discs get to move along between inactive and cleaning positions and vice versa when their housing parts are closed or opened. In the hinged open position of the housing parts, a pair of spectacles can be placed with its nose bridge upon a support element that is provided inside one of the housing parts. With this the pair of spectacles needs to be in its fold-in state and needs to be manoeuvred with spacings between glasses and fold-in legs of the pair of spectacles over upper parts of those cleaning discs that are destined for cleaning back faces of those glasses. Those cleaning discs then immediately are in their cleaning position and lie against the back faces of the glasses. By subsequently closing the two housing parts, the opposing cleaning discs that are destined for cleaning front faces of the glasses are moved towards their cleaning position in which they lie against the front faces of the glasses. The electromotor then can be switched on for a certain period of time, during which the glasses get brushed clean by the rotating cleaning discs. With this a cleaning liquid gets sprayed onto the glasses via nozzles that are directed towards both faces of the glasses. The cleaning discs are covered with exchangeable coverings. In order to be able to deal with different types and shapes of glasses, it is foreseen for this known device to have the cleaning discs borne movable relative to the nose bridge support element and have an eccentric mechanism impose a sliding movement thereto superposed upon the rotating of the discs.

A disadvantage with this device is that the cleaning result leaves to be desired. The rotating cleaning discs have a high chance of leaving behind streaks, spots, stains, and the like, in a kind of circular patterns on the glasses. Also, dots are likely to be left behind on each of the glasses, specifically at center points of the cleaning discs where a brushing effect is close to zero. Furthermore, the rotating cleaning discs tend to brush dirt that is present on the glasses somewhat outward during rotation at high speeds because of centrifugal forces. This dirt then may accumulate and get stuck behind frame edges of the pair of spectacles. Another disadvantage is that the entire cleaning discs may saturate themselves rather quickly with dirt and cleaning liquid, which from then on may well lead to a mere spreading or smearing of dirt over the glasses. Yet another disadvantage is that the cleaning discs need to get preformed corresponding to the curved shape of the glasses, whereas such glass shapes as well as their dimensions may greatly differ over time and per person. Also it may well appear that a protective coating that may be present on the glasses gets accidentally removed. Furthermore, at high rotational speeds, frictional forces may get such high that the glasses may get too hot, leading to a possible damaging thereof.

The present invention aims to at least partly overcome those disadvantages or to provide a usable alternative. In particular it aims to provide a user-friendly and economic cleaning device with which superb cleaning results can be achieved for pairs of glasses within limited amount of times and for a large number of times without each time having to replace coverings or the like of cleaning elements.

This aim is achieved by the cleaning device for a pair of spectacles according to claim 1. The device comprises a housing defining a cleaning space, a mounting part for holding the pair of spectacles inside said space, sets of opposing cleaning elements for cleaning opposing faces of glasses of the pair of spectacles, and a drive unit for moving the pair of spectacles and the cleaning elements relative to each other during a cleaning operation. The sets of opposing cleaning elements are positionable relative to each other between an inactive position, that is configured to have at least one of the sets of the cleaning elements lie spaced from at least one of the opposing faces of the respective glasses, and a cleaning position, that is configured to have the sets of opposing cleaning elements lie against both opposing faces of the respective glasses. According to the inventive thought each of the cleaning elements is bar-shaped. In the cleaning position, longitudinal axis of the bar-shaped cleaning elements extend in one or more directions that is/are substantially parallel to the opposing faces of the glasses. The drive unit is configured to translate the pair of spectacles and the bar-shaped cleaning elements relative to each other substantially parallel to the opposing faces of the glasses while rubbing or wiping them clean.

Thus according to the present invention the cleaning device is well able to perform multiple cycles of cleaning operations for pairs of spectacles in an efficient and time-saving manner and with a cleaning result that is much improved compared to the state of the art. The translating rubbing or whipping movements of the bar-shaped cleaning elements do not leave behind any streaks, spots, stains, or the like, particularly not in centre parts of the glasses. The glasses get to undergo a gentle and smooth translational cleaning movement that does not excessively heat up the glasses, and that leaves coatings fully intact that may be present on the glasses. Even areas close to frame edges of a pair of spectacles now can get perfectly cleaned. Dirt does not get a chance to accumulate itself there. Another important advantage is that the entire cleaning process now can be kept fully dry. A dispensing of cleaning liquid against the glasses is not necessary for obtaining the aimed improved cleaning performance. This also brings the advantage that the cleaning process can be performed quick and efficient. A time-consuming drying step is not required. Furthermore it makes it possible to use a same set of bar-shaped cleaning elements far more times compared to the state of the art, because they no longer quickly can get saturated with cleaning liquid and dirt.

The bar-shaped cleaning elements can be provided with all kinds of longitudinal shapes, like straight, stepped or curved.

In addition thereto or in the alternative they can be provided with all kinds of cross sections, like rectangular, triangular, square, hexagonal, pentagonal or any other kind of polygon, with or without rounded corners, or gradually curved all around, like oval or circular. Preferably they have a rather slender cross-section that is smaller than their length.

In a preferred embodiment each of the cleaning elements may have a cross-sectional dimension that is at least smaller than a free space between the glasses and legs of the pair of spectacles when the legs are in their fold-in state. This may help to keep the housing compact because the pair of spectacles then can be placed therein in its fold-in state. Furthermore it makes it possible to easily have a larger number of bar-shaped cleaning elements positioned adjacent each other in the cleaning position.

Taking into account presently known widths of free spaces between the glasses and legs of pairs of spectacles when their legs are in the fold-in state, the cleaning elements according to the invention preferably may be dimensioned with largest cross-sectional dimensions that lie within a range of 4-20 mm. When however the device is to be used for larger or smaller pairs of spectacles, the cross-sectional dimensions of the bar-shaped cleaning elements as well as the dimensioning of the housing can be altered correspondingly.

In addition thereto or in the alternative the bar-shaped cleaning element may have a varying cross-sectional dimension along its length. For example the cleaning element at a concave side of the glasses then may have a relative large centre section that gradually decreases towards its outer ends, like in a barrel shape, whereas the cleaning element at a convex side of the glasses then may have a relative small centre section that gradually increases towards its outer ends, like in a diabolic shape. This varying cross-sectional dimension then may be combined with one or more of the abovementioned cross-sectional shapes.

In addition thereto or in the alternative the bar-shaped cleaning element may be provided with one or more projections, ribs or flaps, that in particular may extend in the longitudinal direction, but that may also extend along any other desired pattern, like helically around the longitudinal axis. Such ribs or flaps may be flexible, and for example comprise rubber elastic material. In addition thereto or in the alternative such flexible ribs or flaps may be covered with cleaning material, like fabric fiber material, for example a microfiber or a nanofiber, or some other kind of textile material, and/or such cleaning material, like fabric fiber material, for example a microfiber or a nanofiber, or some other kind of textile material, may be provided in between adjacent ribs or flaps, for example by being connected to free outer ends of the ribs or flaps.

The bar-shaped cleaning elements can have all kinds of lengths, but preferably have lengths that are at least longer than a largest cross-sectional dimension of the glasses in the direction parallel to the bar-shaped cleaning elements added with the minimum foreseen relative rubbing or wiping translation in that direction during a cleaning operation. In particular those lengths of the bar-shaped cleaning elements are at least 10%, and more specifically at least 20%, longer than the largest cross-sectional dimension of the glasses in the direction parallel to the longitudinal direction of the bar-shaped cleaning elements, in particular in a height direction of the glasses. This has the advantage that the bar-shaped cleaning elements and the pair of spectacles than can be translated back and forth relative to each other without edges of outer ends of the cleaning elements and edges of frame parts of the pair of spectacles getting to pass each other.

Taking into account presently known heights and widths of glasses of pairs of spectacles, the cleaning elements according to the invention preferably may be dimensioned with longitudinal dimensions that lie within a range of 30-70 mm. When however the device is to be used for larger or smaller pairs of spectacles, the lengths of the bar-shaped cleaning elements as well as the dimensioning of the housing can be altered correspondingly.

Each bar-shaped cleaning element can be made one-piece. In the alternative it can also comprise a number of connectable pieces, like for example an upper and a lower portion that can automatically be connected with each other, for example with a male and female portion, when moved from the inactive position towards the cleaning position. It is also possible for the bar-shaped cleaning elements to rise out of a part of the housing from their inactive towards their cleaning positions. It is also possible to have the upper and lower portions not get connected with each other but instead remain being independently movable from each other, for example with own translational swinging/rocking rubbing or wiping movements relative to the glasses.

The bar-shaped cleaning elements may be flexible such that can make snake-like translational rubbing or wiping movements or fold-in and out like a bellow and thus also make translational rubbing or wiping movements relative to the glasses. Preferably however they are made such that they have a rigid core such that they are able to maintain their longitudinal shape when pressed against the glasses in their cleaning position. The rigid core can be provided in the centre axis but can also be provided eccentrically. The rigid core can for example be made of metal or plastic or any other kind of sufficiently rigid material, like for example a cold foam. In the alternative each bar-shaped cleaning element may however also comprise a number of hingedly connected segments that are movably connected with each other, like for example a segmented finger, such that it can easily adapt itself to any shape of glasses it gets to deal with, or like for example a folding rule that can be folded open from the inactive position towards the cleaning position, or like a telescopically extendable stick that can be telescopically extended from the inactive position towards the cleaning position, or a combination of those principles.

In line herewith it is also possible to have the bar-shaped cleaning element mounted in between two articulated/segmented support elements that are configured to upon operation by the drive unit have the cleaning element perform translational up/down/left/right back and forth rubbing or wiping movements relative to the glasses at a same time. This can be done with the pair of spectacles held in place or moved at a same time.

Instead of having the bar-shaped cleaning element held at one or both of its free outer ends, it is also possible to have it held, for example by some kind of sideways or backways extending support element, at any other position along its longitudinal direction, for example in a centre position. The cleaning element then may also be rotatably held by such a support element, such that it can be driven to for example make back and forth rotational rubbing or wiping strokes relative to the glasses, of in particular less than 360 degrees around a centre of rotation, more in particular about a quarter of a turn. This may help to have the cleaning element also reach difficult to reach edge sections of the pair of spectacles.

The bar-shaped cleaning elements may comprise a compressible layer between a rigid core and cleaning material at their outer surface. This makes it well possible for the bar-shaped cleaning elements to adapt themselves to differing shapes of the glasses when biased and/or pressed against them in the cleaning position. In addition thereto or in the alternative each of the bar-shaped cleaning elements can also be positioned biased in a direction towards the glasses, such that they are able to exert a pressing force upon the glasses during a cleaning operation.

The bar-shaped cleaning elements can be positioned parallel to each other. It is however also possible to have them extend in different directions as long as those directions are substantially parallel to the opposing faces of the glasses and also substantially parallel to the foreseen translational rubbing or wiping directions.

The bar-shaped cleaning elements can be kept in one or more discrete rotationally fixed positions during a cleaning operation such that they cannot and do not get actively rotated around their longitudinal axis by the drive unit during a cleaning operation, and instead merely get to exert a translational rubbing or wiping cleaning movement relative to the glasses. It is however also possible to have the translational rubbing or wiping cleaning movement according to the invention combined with other types of movement, like having the bar-shaped cleaning elements at a same time rotate at a certain speed around their longitudinal axis and/or to have them vibrate at a certain frequency and/or to have them expand or retract during such a cleaning operation.

In a preferred embodiment, each of the bar-shaped cleaning elements can be rotatable stepwise around its longitudinal axis in between respective phases of the cleaning operation, for having different circumferential sections of the bar-shaped cleaning elements come to lie opposite and/or against the opposing faces of the respective glasses during subsequent phases of the cleaning operation. This advantageously makes it possible to periodically present a number of fresh cleaning surfaces for the glasses during subsequent phases of the cleaning operation. For that the only thing that needs to be done is to have the bar-shaped cleaning elements get rotated around their longitudinal axis over a certain angle. This angle can for example be dependent on the cross-sectional shape of the elongate cleaning element. If for example the cleaning element has a circular cross-section then the angle over which it needs to be rotated can be any angle between 1-360 degrees in order to have a fresh cleaning surface positioned in front of the glasses. If for example the cleaning element has a rectangular cross-section with opposing sides that are each equipped with suitable cleaning surfaces, then that cleaning element needs to be rotated over an angle of 90 or 180 degrees in order to position a fresh cleaning surface in front of the glasses. If for example the cleaning element has a triangular cross-section with three sides that are each equipped with suitable cleaning surfaces, then that cleaning element needs to be rotated over an angle of 120 degrees in order to position a fresh cleaning surface in front of the glasses.

Thus, during a translational rubbing or wiping movement the cleaning elements in particular do not rotate at a constant speed around their longitudinal axis. Only after having finished a specific phase of the translational rubbing or wiping cleaning movement, the cleaning elements get to rotate a step around their longitudinal axis towards a subsequent longitudinal section of cleaning surface. This step rotation can be flexibly adjusted each time with a same step, but also can be done with differing steps like for example 120-120-123 degrees or 180-183 degrees, dependent of the number of provided different cleaning surfaces divided around the circumference of the cleaning element. For example the steps can be chosen such that after a number of completed cleaning operations the cleaning elements are back in their 0 degrees starting positions.

In addition thereto the different sections of the bar-shaped cleaning elements can be equipped with different types of cleaning materials, like fabric fiber material, for example a microfiber or a nanofiber, or some other kind of textile material, for use during the subsequent phases of the cleaning operation. Thus the types of cleaning materials can be chosen such that they perfectly fit to a specific phase of the cleaning operation. In particular a first type of cleaning material, like for example a deep-pile cloth/textile material, can then be configured for a starting phase of the cleaning operation, and a second type of cleaning material, like for example a low-pile cloth material, can then be configured for a finishing phase of the cleaning operation. The deep-pile then may be particularly important for cleaning edges between frame and glasses of a pair of spectacles in the case that the pair of spectacles has a frame that extends all or partially around the glasses. If desired also three or more different types of cleaning materials can be provided on different circumferential sections of the cleaning elements, each specifically configured for a specific phase of a cleaning operation.

In addition thereto or in the alternative the bar-shaped cleaning element may in itself comprise a number of smaller bar-shaped sub-cleaning elements, for example 3-in-1, that may each be provided with a different type of cleaning material and/or that may each be stepwise rotatable around their own longitudinal axis for having and/or that may be rotatable stepwise as an assembly around a common centre axis, such that after each phase of a cleaning operation a subsequent one of the sub-cleaning elements get moved in front of the glasses.

The drive unit, for example an electromotor, that is configured for translating the pair of spectacles and the bar-shaped cleaning elements relative to each other in the direction that is substantially parallel to the opposing faces of the glasses, can further be configured to also cause the bar-shaped cleaning elements to rotate stepwise periodically after a pre-set number of translations of the pair of spectacles and the bar-shaped cleaning elements relative to each other have been performed. It is however also possible to provide two distinctive drive units, for those operations.

In another preferred embodiment each set of opposing cleaning elements may comprise a plurality of bar-shaped cleaning elements that are positioned side-by-side. This makes it possible to provide overlapping cleaning zones for the respective bar-shaped cleaning elements, that is to say overlapping during the foreseen translational relative movements between the pair of spectacles and the bar-shaped cleaning elements relative to each other substantially parallel to the opposing faces of the glasses while rubbing or wiping them clean. In the alternative it is also possible to have the bar-shaped cleaning elements positioned in other manners relative to each other, like for example behind each other.

In addition thereto it is also possible to provide different types of cleaning elements next to each other, like ones with different cross-sectional dimensions and/or ones that are equipped with differing types of cleaning materials at their surfaces. For example outer ones of the cleaning elements, that is to say ones that lie closer to the frame parts of the pair of spectacles during a cleaning operation, then may have smaller cross-sections than intermediate ones, that is to say ones that lie closer to centres of the glasses of the pair of spectacles during a cleaning operation. Owing to their smaller cross-sectional dimensions, the smaller ones then can more easily reach edges of the frame parts and thus may offer an improved cleaning result at those positions.

In addition thereto it is also possible to have the adjacent cleaning elements move independent from each other, in particular perform different translational movements, for example in their longitudinal direction and/or sideways and/or swinging/rocking. In addition thereto two adjacent ones of the cleaning elements then can be configured to translate in opposite directions.

It the alternative or in addition thereto, each set of opposing cleaning elements may comprise a plurality of bar-shaped cleaning elements that are positioned side-by-side, wherein each cleaning element may have its own specific characteristics and qualities and type of cleaning surfaces. During a specific phase of a cleaning operation, a corresponding type of cleaning element then may come forward out of the row and start performing its rubbing or wiping movements, after which it can be retracted again towards the row while another comes forward for performing its specific task during a subsequent phase of the cleaning operation.

In another preferred embodiment the longitudinal axes of the bar-shaped cleaning elements, that extend substantially parallel to the opposing faces of the glasses, more specifically may extend in a direction from a lower side towards an upper side of the opposing faces of the glasses. This may help to make it easier to position the pair of spectacles inside the housing.

In another preferred embodiment the drive unit may be configured to translate the pair of spectacles and the bar-shaped cleaning elements relative to each other substantially parallel to the opposing faces of the glasses while following a two-dimensional track, in particular a closed-loop track, like a circular or elliptical one, more in particular a closed-loop track with up and down and left and right back and forth trajectories. This makes an improved cleaning possible. In particular those two-dimensional relative rubbing or wiping translations are profitable to clean corners between frame and glasses of a pair of spectacles in the case that the pair of spectacles has a frame that extends all or partially around the glasses. In the alternative it is also possible to have the bar-shaped cleaning elements and the pair of spectacles translate relative to each other while following a one-dimensional track that can be linear or curved like in a windscreen wiper.

The mounting part for holding the pair of spectacles inside the cleaning space can for example be formed by a nose bridge clamp. This makes it possible for firmly gripping the pair of spectacles inside the housing. Other kinds of mounting parts are however also possible.

The housing can have all kinds of shapes, like with two housing parts that are moveably connected to each other between closed and open positions. In an embodiment at least part of the housing is shaped such that it fits into a cup holder of for example a car or the like. In such an embodiment the movable part of the housing then may slide upwards towards an open position in which the pair of glasses can be placed therein in an upright position, after which the housing can be closed again and activated for having a cleaning operation performed.

In a preferred embodiment it is the pair of spectacles that gets translated by the drive unit relative to the bar-shaped cleaning elements. This makes it possible to keep the drive unit compact and simple, like for example including a tooth-rack mechanism that connects to the mounting part for the pair of glasses in such a way that it lets the pair of glasses exert the aimed one-dimensional or two-dimensional translational movements inside the cleaning space relative to the bar-shaped cleaning elements.

Further preferred embodiments are stated in the dependent subclaims.

The invention also relates to a method according to claim 14 or 15.

The invention shall be explained in more detail below with reference to the accompanying drawings, in which.

Figure 1:
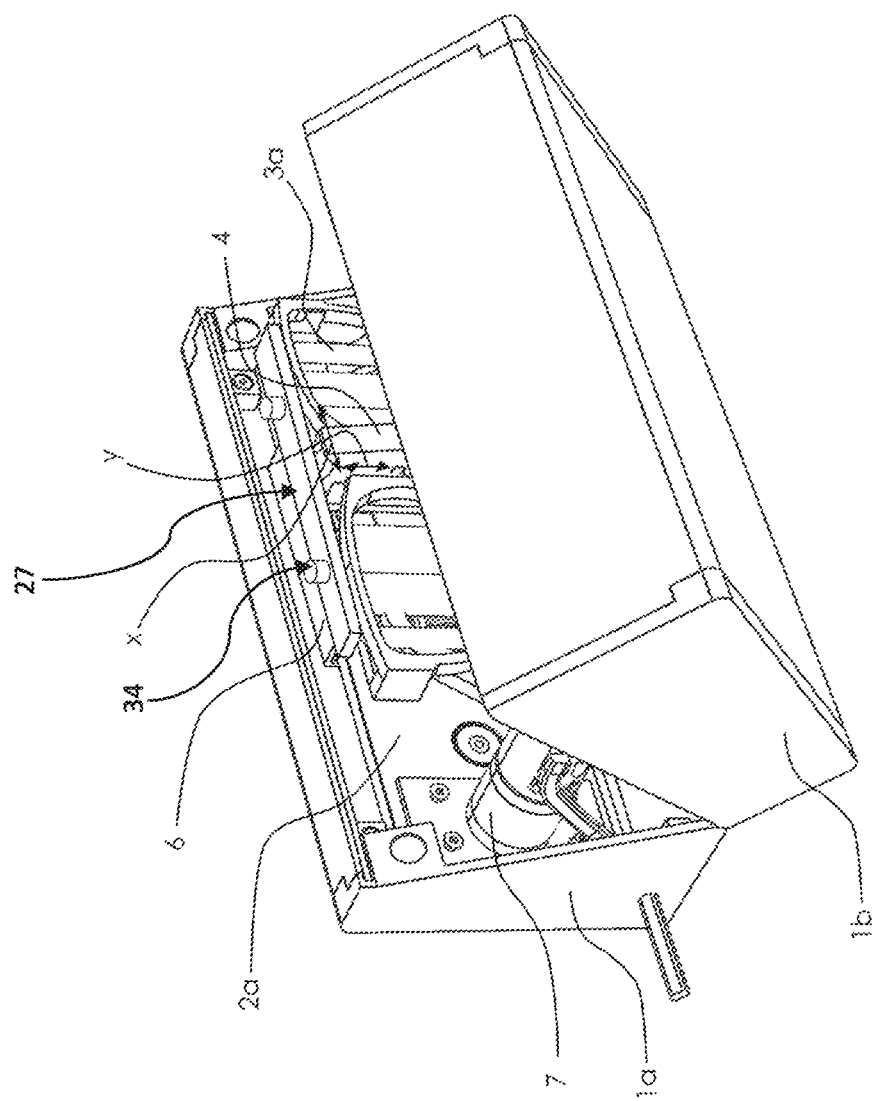
FIG. 1 shows a schematic perspective view of an embodiment of the cleaning device invention with first and second housing parts in a hinged open position.
Figure 6A:
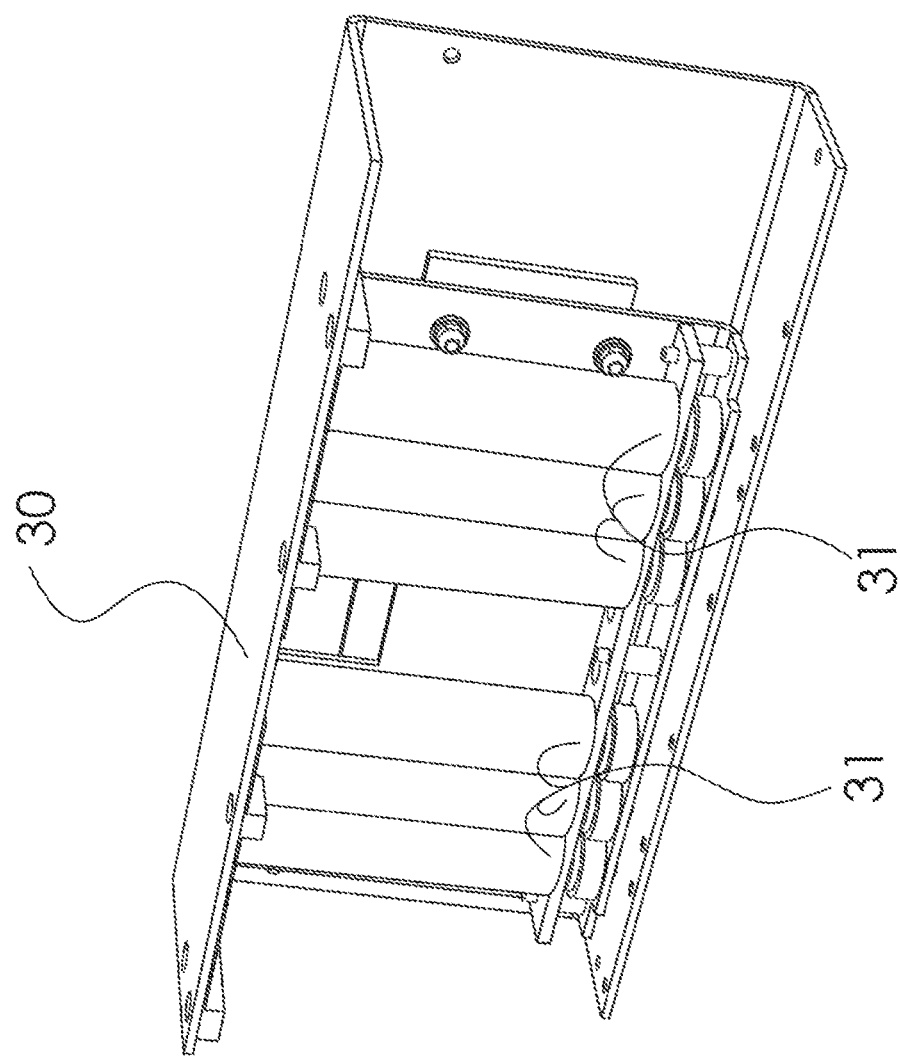
Figure 6C:
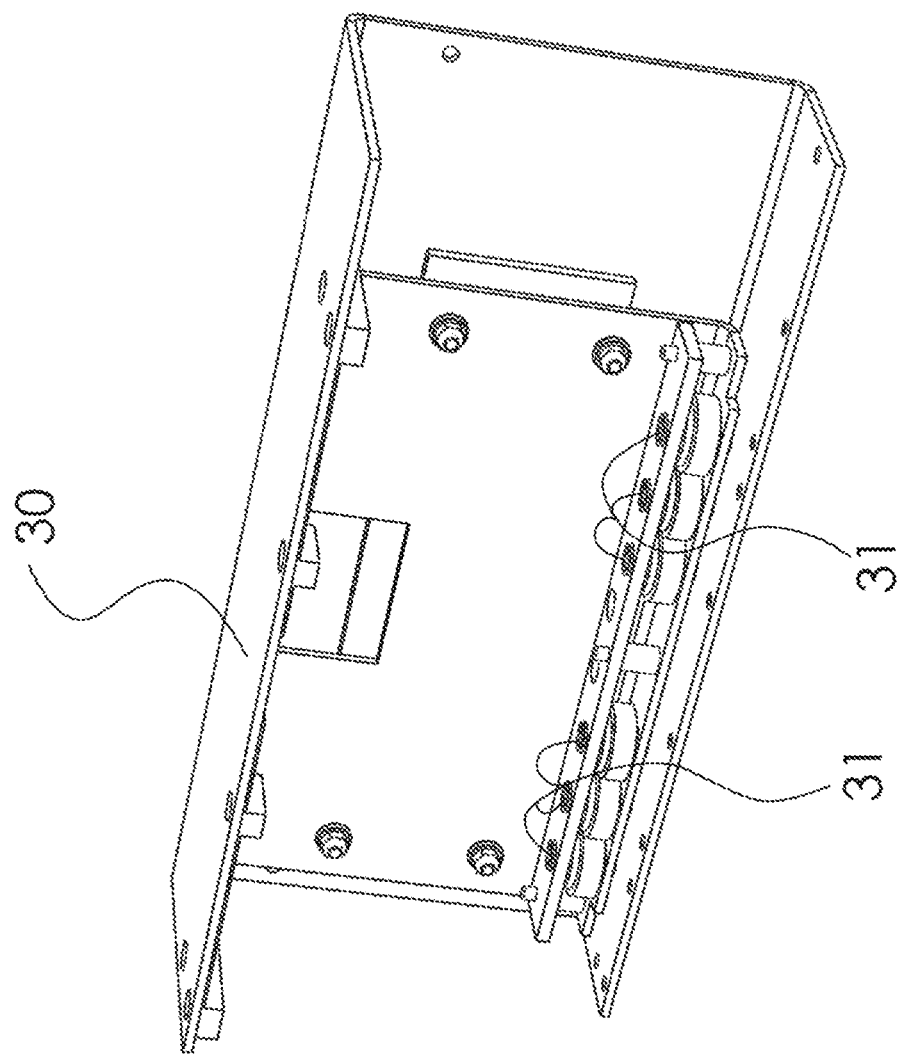
Figure 8:
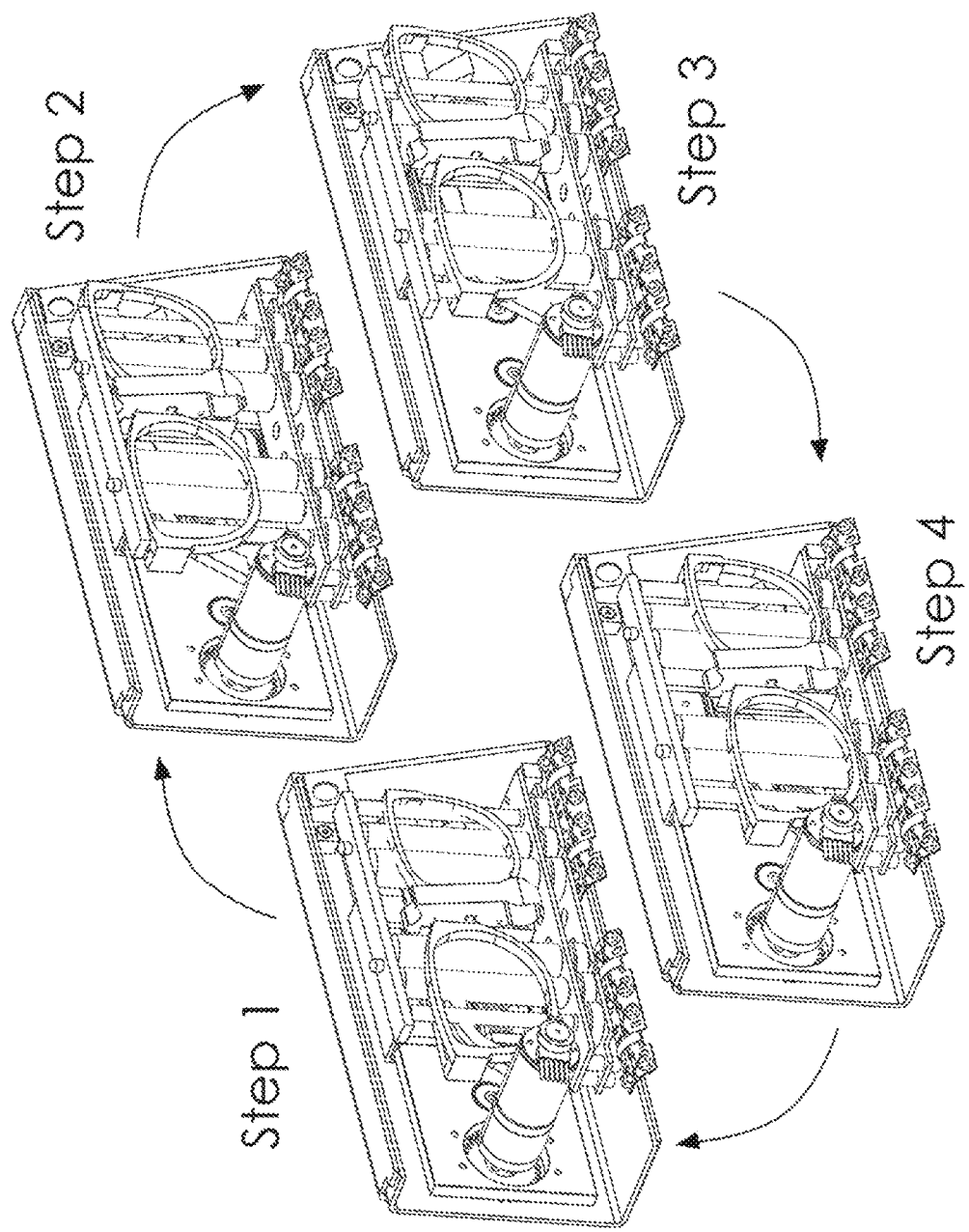
Figure 9:
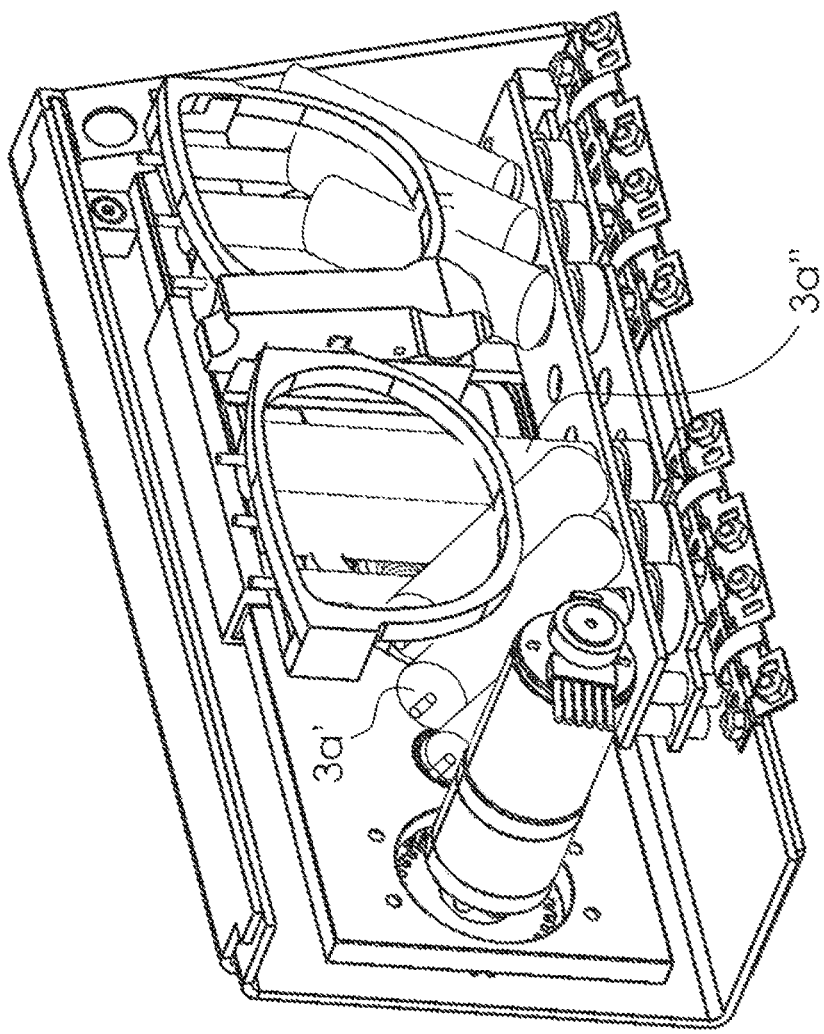
Figure 10:
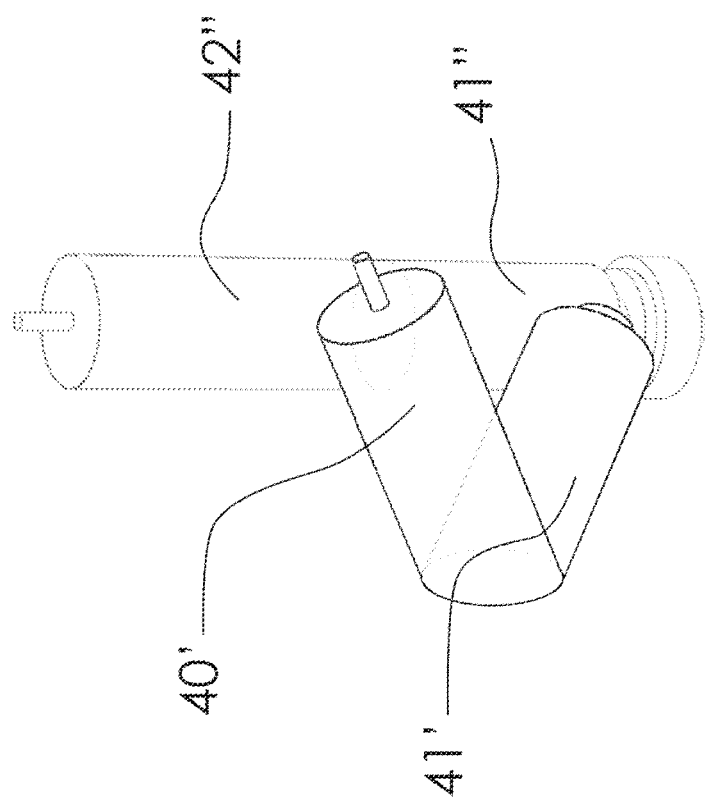
Figure 11:
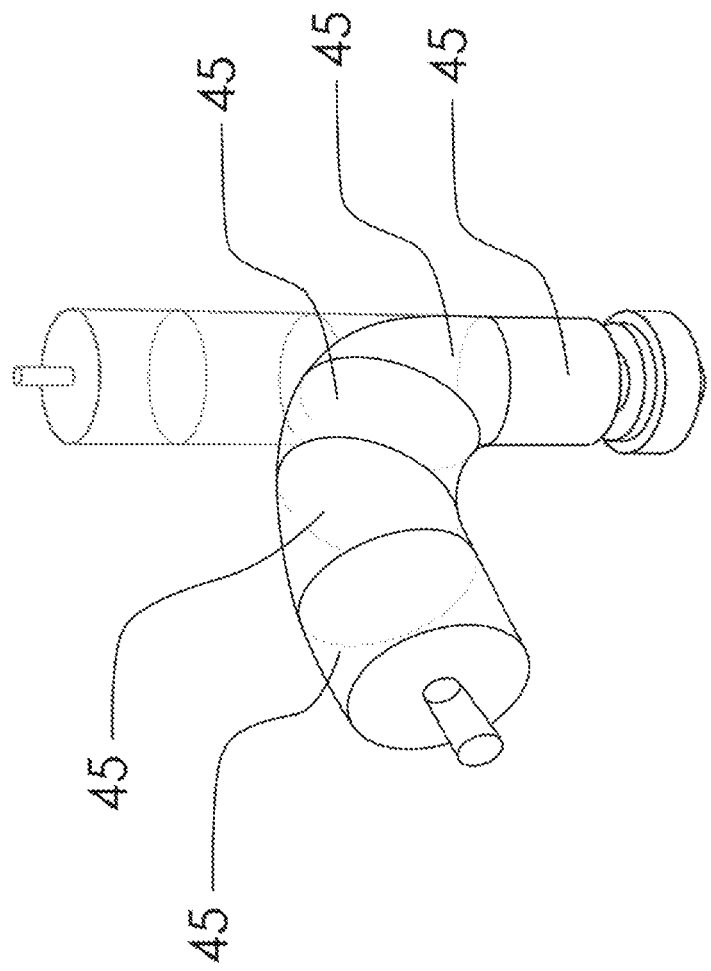
Figure 12:
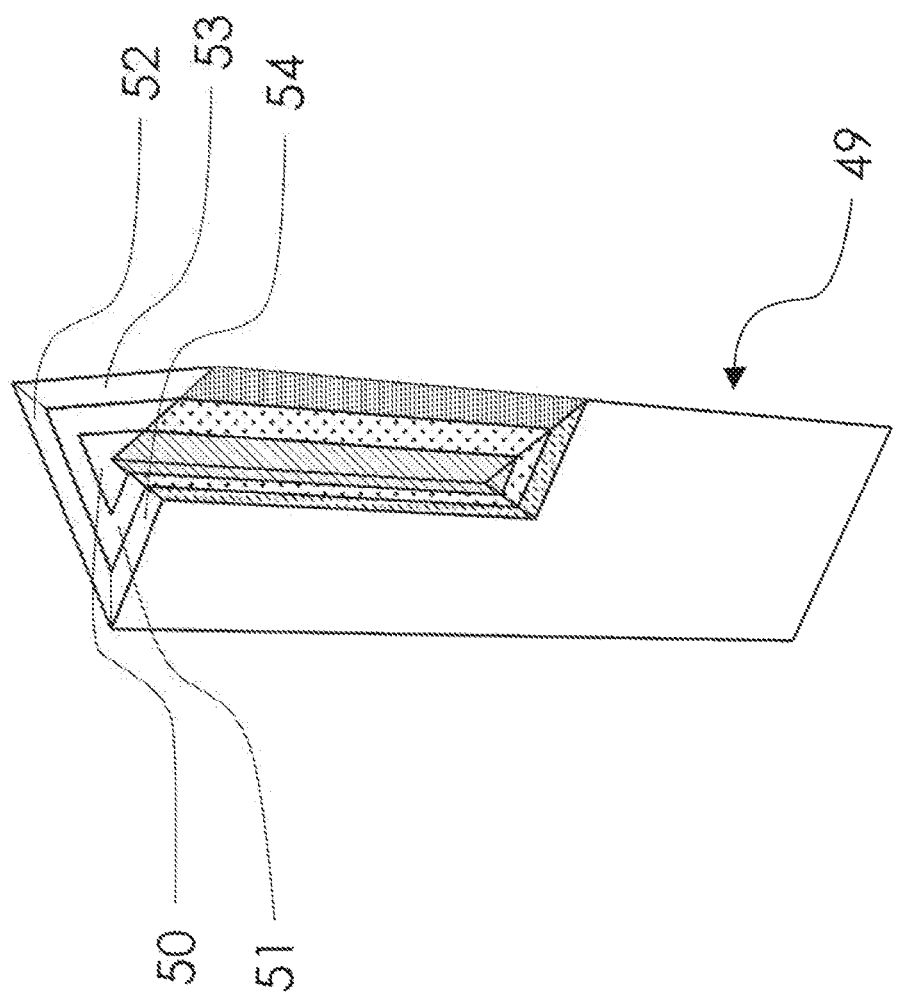
Figure 13:
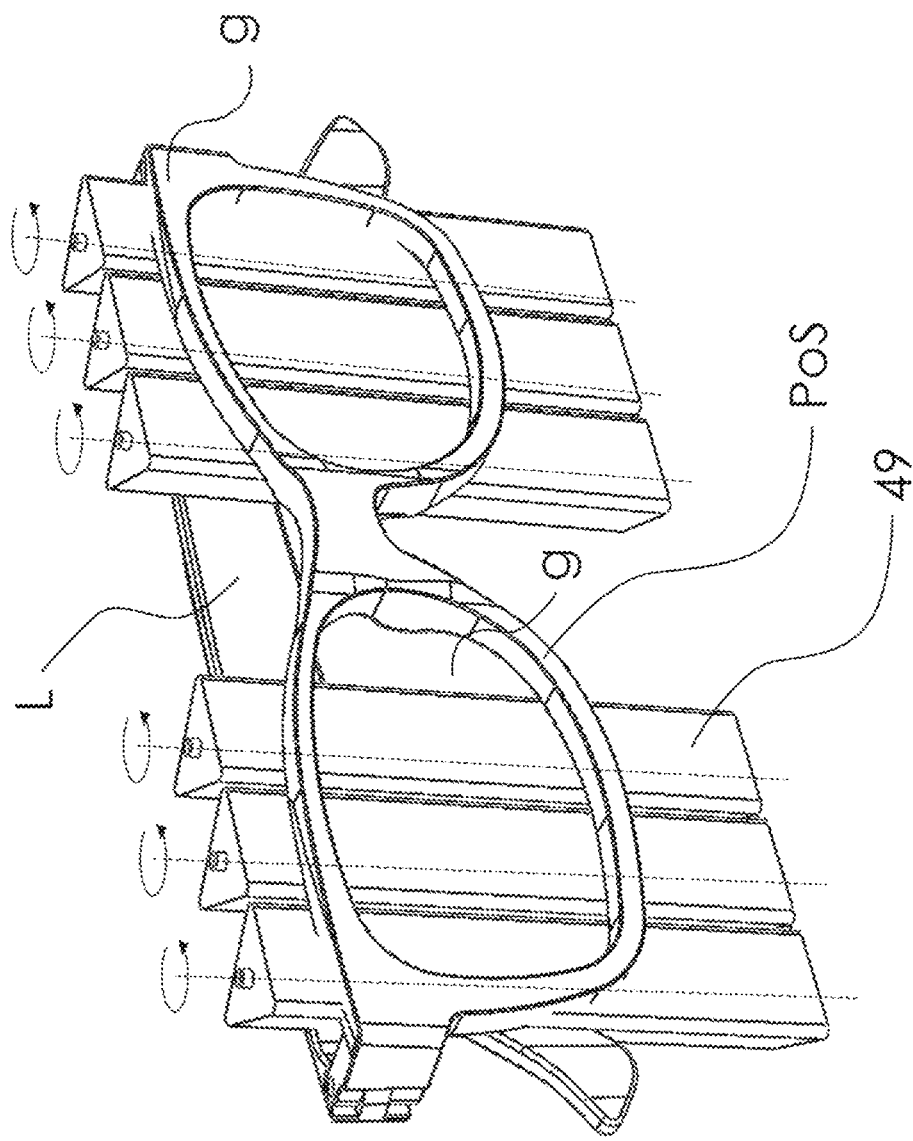
Figure 14:
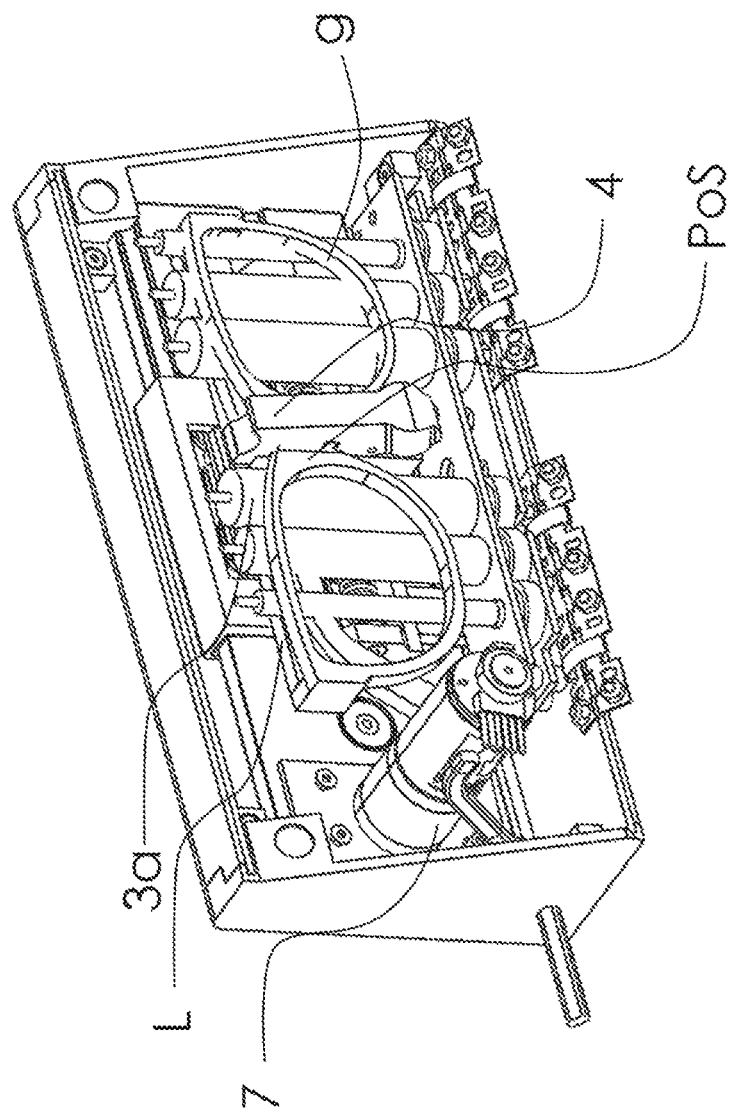
Figure 15:
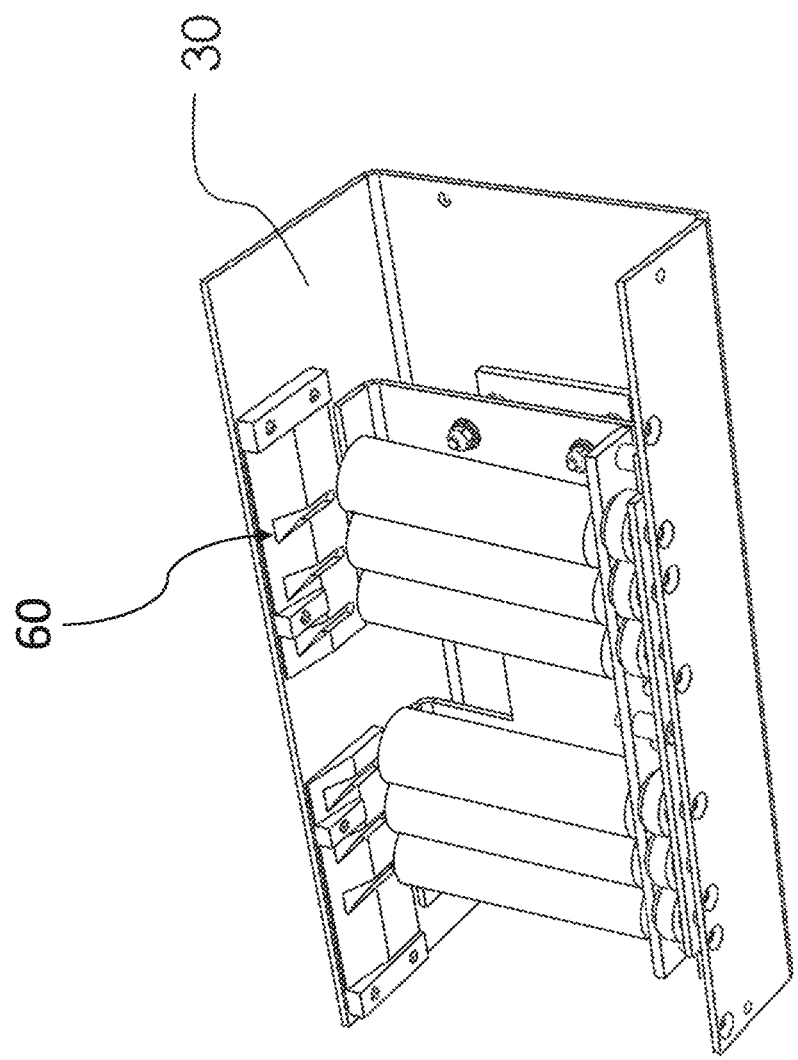
Figure 16:
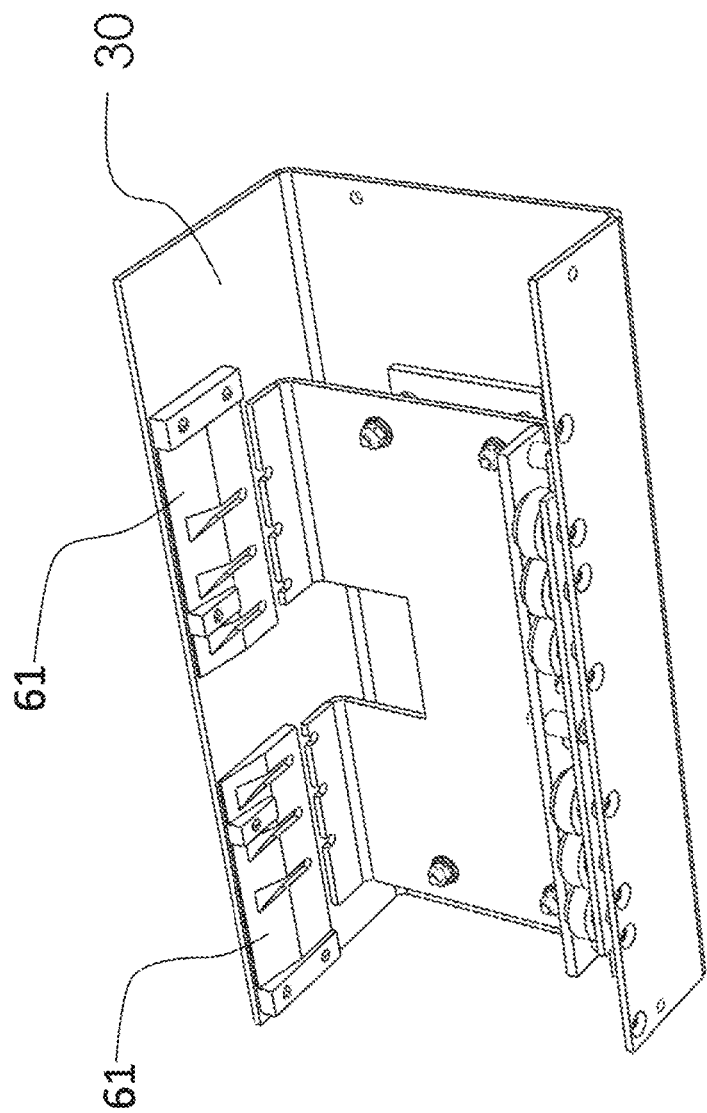

FIG. 6a, b, c show views of the second cleaning mechanism portion from out of different angles and with and without the cleaning elements placed therein;

FIG. 7 shows a pair of spectacles positioned over and in front of the first cleaning mechanism portion;

FIG. 8 shows four respective cleaning phases for the view of FIG. 6;

FIG. 9 shows a schematic variant with tiltable cleaning elements;

FIG. 10 shows a variant of a foldable cleaning element;

FIG. 11 shows a variant of a segmented cleaning element;

FIG. 12 shows a variant of a triangular cleaning element;

FIG. 13 shows a number of the triangular cleaning elements with a pair of spectacles positioned over them; and FIG. 14-16 show a variant for upper connections for the cleaning elements of FIG. 1.

Figure 2:
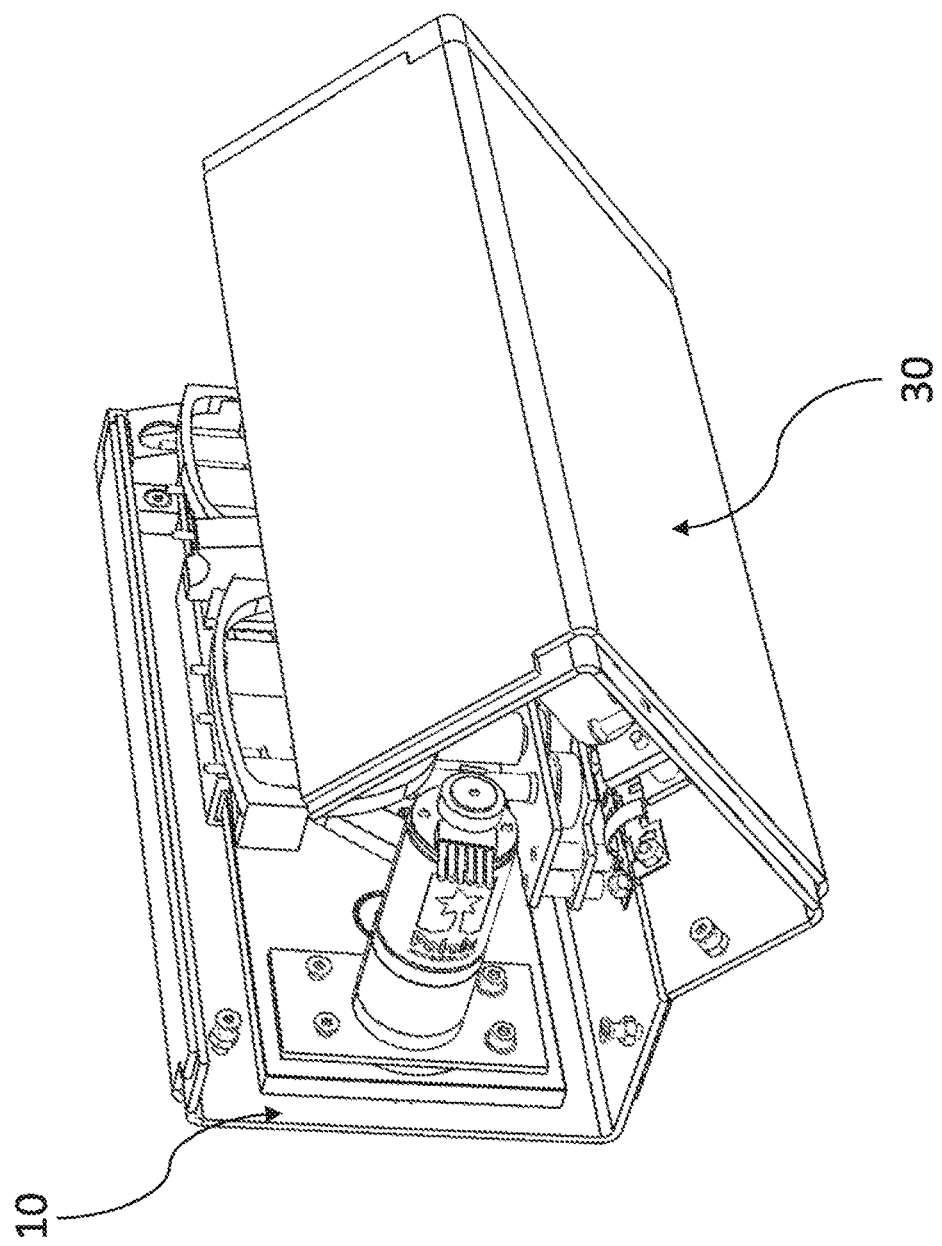
FIG. 2 shows first and second cleaning mechanism portions that are provided inside the housing parts.

In FIG. 1 first and second parts of a housing 1 of the cleaning device have been indicated with the reference numerals 1a, 1b. Inside the housing part 1a a cleaning mechanism portion 2a is provided that comprises two neighbouring sets of three adjacent upright standing bar-shaped cleaning elements 3a. See FIGS. 1, 2 and 3. Inside the housing part 1b a cleaning mechanism portion 2b is provided that also comprises two neighbouring sets of three adjacent upright standing bar-shaped cleaning elements 3b. See FIG. 6.

The sets of cleaning elements 3a, 3b are provided at fixed positions relative to their housing parts 1a, 1b. Each cleaning element 3a, 3b here has a cylindrical bar-shape with a diameter that is substantially smaller than its length. Two outer ones of the sets of cleaning elements 3a, 3b have a smaller diameter than the other ones. Furthermore, each cleaning element 3a, 3b comprises a rigid core that is covered at its outer circumference with a cleaning cloth material that is configured for rubbing or wiping the glasses G clean while taking in at least some of the dirt they get to encounter on those glasses G. An elastically compressible material, like rubber, can be placed in between the rigid core and the cleaning material.

In a hinged-open position of the housing 1, as shown in FIG. 1, a pair of spectacles PoS can be placed with its glasses G in between the opposing sets of cleaning elements 3a, 3b. With this the pair of spectacles PoS needs to be with its legs L in a fold-in state. The fold-in pair of spectacles PoS then can be slid over the two neighbouring sets of cleaning elements 3a of the cleaning mechanism portion 2a in the first housing part 1a, with the glasses G getting to lie in front of those cleaning elements 3a and with the legs L getting to lie behind those cleaning elements 3a. See also FIG. 7.

Inside the first housing part 1a a mounting part 4 is provided for the pair of spectacles, that here is formed by a manually operable biased nose bridge clamp that can be pressed open in order to be able to position a nose bridge of a pair of spectacles PoS therein. Upon relief, the clamp shall close again and start to firmly grip the nose bridge and thus hold the pair of spectacles PoS in position inside the housing 1.

The clamp mounting part 4 is connected to a translation mechanism 6 that is configured to move the pair of glasses PoS from left to right in a direction x (in the orientation shown here horizontally) and up and down in a direction y (in the orientation shown here vertically) relative to the housing part 1a and thus also relative to the sets of cleaning elements 3a. The directions x and y are perpendicular to each other. The cleaning elements 3a, 3b are positioned to extend with their longitudinal center axis in the x-y plane (in the orientation shown here vertically in the y-direction). An electromotor 7 is provided for driving the translation mechanism 6.

With reference to FIG. 3-6 the respective cleaning mechanism portions 2a, 2b including the translation mechanism 6 shall now first be explained in more detail.

The first cleaning mechanism portion 2a comprises a frame plate 10 with which a number of gearwheels 11 are rotatably connected. See FIGS. 3 and 4. Those gearwheels 7 can be rotated by means of the electromotor 7.

A back plate 14 is mounted in front of the gearwheels 11. A rack box 15 is connected slidable in the x-direction to the back plate 14. A rack plate 16 is connected slidable in the y-direction to the rack box 15. The rack plate 16 comprises a loop-shaped toothed track 17 into which a pinion 18 of the set of gearwheels 11 grips. A nose box 19 is fixedly connected to the rack plate 16.

The clamp mounting part 4 is connected to the nose box 19 in such a way that it can slide somewhat in the x-direction relative thereto. It is biased into a center position relative to the nose box 19 by means of springs 20. See FIG. 3.

Upon a switching on of the electromotor 7, the gearwheels 11 start to drive the pinion 18 which in turn shall force the assembly of the rack box 15 and rack plate 16 start to translate in the x- and y-directions while having the loop-shaped track 17 move around the pinion 18. Owing to this the clamp mounting part 4 also gets forced to move along with translations in the x- and y-directions and a pair of spectacles PoS also can get forced to perform translational rubbing or wiping movements in the x-y directions relative to the cleaning elements 3a, 3b.

Figure 3:
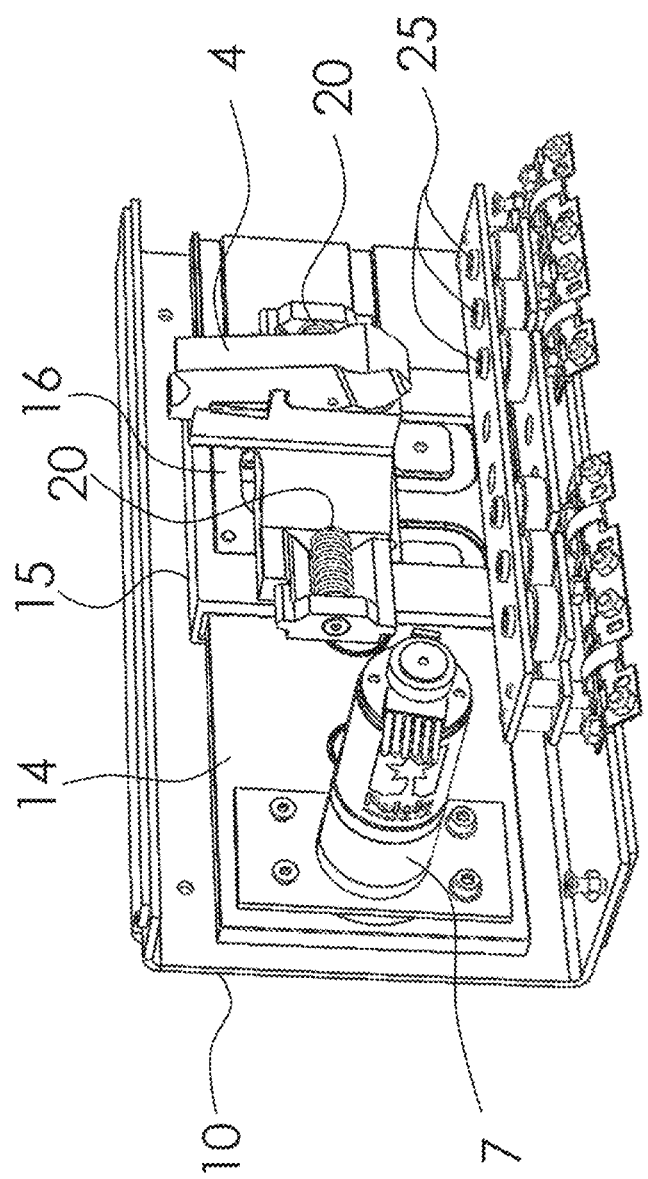
FIG. 3 shows a view of the first cleaning mechanism portion without cleaning elements.
Figure 4:
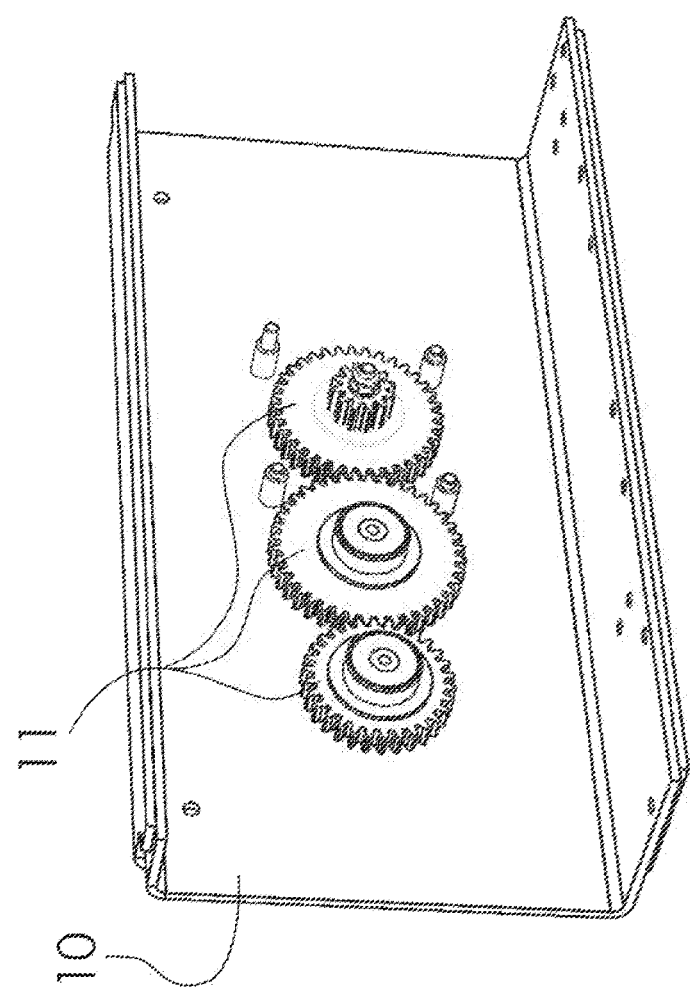
FIG. 4 shows a gear transmission part of the first cleaning mechanism portion of FIG. 3.
Figure 5:
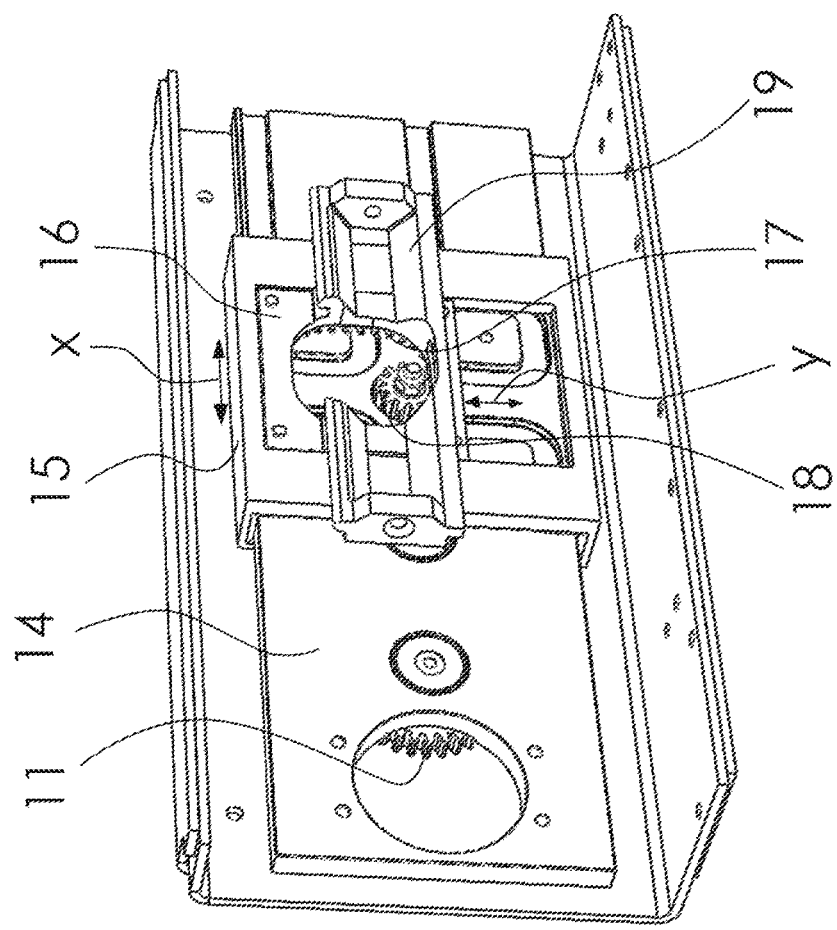
FIG. 5 shows a translation mechanism part of the first cleaning mechanism portion of FIG. 3.

In FIG. 3 lower bearings 25 are shown for the cleaning elements 3a. The lower bearings 25 are rotatably connected to the frame plate 10. The cleaning elements 3a can easily be placed with lower ends of their rigid cores into the bearings 25, for example with a form fit connection. On their upper ends an interconnection strip 27 is placed over upper ends of the rigid cores of the cleaning elements 3a. Thus they can be reliably held in their standing positions. It is noted that in FIG. 2 the strip 27 is not shown such that the upper core ends are well visible.

In FIG. 6 the second cleaning mechanism portion 2b is shown. It comprises a frame plate 30 with lower bearings 31 for the cleaning elements 3b. The lower bearings 35 are rotatably connected to the frame plate 30. The cleaning elements 3b can easily be placed with lower ends of their rigid cores into the bearings 31, for example with a form fit connection. The upper ends of the rigid cores of the cleaning elements 3b lie in slots of a connection plate 32 such that they are delimited in the x-direction. In the y-direction the cleaning elements 3b are delimited with their cylindrical cleaning parts in between the bearings 31 and the plate 32.

At an upper flange part of the frame 30, two slots 33 are provided. Those slots 33 inside the housing part 1b are configured to automatically take in two pins 34 that are provided at an upper side of the interconnection strip 27 inside the housing part 1a when the housing 1 gets closed. Thus also the cleaning elements 3a get delimited in the x-direction, whereas, in the y-direction, those cleaning elements 3a are delimited with their cylindrical cleaning part in between the bearings 25 and the strip 27.

Both the bearings 25 as the bearings 31 form part of a turn mechanism that is configured to rotate the bearings 25 and 31 stepwise during respective phases of each cleaning operation. Thus "fresh" different circumferential sections of the bar-shaped cleaning elements 3a and 3b can come to lie against opposing faces of the glasses G during those subsequent phases of each cleaning operation. The stepwise rotation of the cleaning elements 3a and 3b gets automatically forced upon them by the electromotor 7 when switched-on for having the relative translational rubbing or wiping movements performed. With this a clock mechanism can be provided that is configured for having a stepwise rotation forced upon the bearings 25 each time after a certain number of rubbing or wiping translation loops, for example at least 5 loops, have been executed by the translation mechanism 6.

The frame plates 10 and 30 and thus also the housing parts 1a, 1b are hingedly connected to each other between the shown open position and a closed position. In the open position the pair of spectacles PoS can be placed in its fold-in state over the cleaning elements 3a with the back faces of the glasses G already coming to lie against front sides of the cleaning elements 3a. In the open position the cleaning elements 3b lie in their inactive position in which their front sides lie spaced from the front faces of the glasses G. By subsequently closing the housing 1, the cleaning elements 3b get automatically moved towards their cleaning position in which their front sides come to lie against the front faces of the glasses G. Thus in the closed position of the housing, both the sets of opposing cleaning elements 3a and 3b lie against both opposing faces of the respective glasses G. Preferably the cleaning elements in this closed position of the housing lie biased against the glasses G for example by means of the bearings 25, 31 being biased by springs or the like in a direction perpendicular to the x-y plane.

Subsequently the following mode of operation is possible for having a cleaning operation or cycle performed on the pair of spectacles: After placement of the pair of spectacles PoS, and closing of the housing 1, the electromotor 7 can get activated. This shall activate the translation mechanism 6 to force the pair of spectacles PoS to translate in the x-y plane while following the loop-shaped track 17 and while sliding in between and along the front sides of the opposing sets of cleaning elements 3a, 3b. One such translation loop is shown in four steps in FIG. 7.

It is noted that during the moving of the pair of spectacles PoS in between and along the respective sets of bar-shaped cleaning elements 3a, 3b, it has deemed important and advantageous that the clamp mounting part 4 has some flexibility to move in the x-direction relative to the nose box 19 of the translation mechanism 6. This helps to prevent that the pair of glasses PoS gets damaged during cleaning.

Each time after the pair of spectacles PoS has made a pre-defined number of translation loops, the cleaning elements 3a, 3b shall get turned by the turn mechanism over a pre-defined angle that is at least large enough for new fresh and clean circumferential sections of the cleaning elements 3a, 3b to get positioned in front of and against the glasses G. This performing of a number of translation loops followed by a rotational angle turn of each of the cleaning elements 3a, 3b gets repeated a number of times, for example two or three times, during the cleaning operation. The stepwise rotating of the cleaning elements define transitions between respective different phases of the cleaning operation, and has appeared to largely increase the cleaning efficiency and life expectancy of the cleaning elements. The refreshing of the cleaning material sections during the cleaning operation gives the used section of cleaning material some time to recover such that during a new cleaning operation it can operate is substantially new/unused again. A smearing out of earlier absorbed dirt thus can be reduced to a minimum.

It is also possible for one or more of the sections to be covered with a different type of cleaning material. For example one or more of the sections can then be covered with a cleaning material that is dedicated to perform one or more rough cleaning phases (starting phases), whereas one or more of the other sections can then be covered with a cleaning material that is dedicated to perform one or more delicate polishing phases (finishing phases). For users this finishing touch shall be much welcomed and immediately recognized when they put on the pair of spectacles again.

In FIG. 9 a variant is shown in which the cleaning elements 3a are hingedly connected to the bearings 25 between an inactive position 3a' and a cleaning position 3a". This makes it possible to more easily place and remove a pair of glasses PoS in and out of the device.

It is also possible to have each bar-shaped cleaning element comprise a number of segments 40, 41, that are flexibly and/or hingedly connected to each other and that can be transferred from a folded-up inactive position 40', 41' towards a folded-out and fixated cleaning position 40", 41". See FIG. 10.

As is shown in FIG. 11, each bar-shaped cleaning element may however also comprise a number of flexibly and/or hingedly connected segments 45 that are configured get transferred towards a number of different positions in which they may be fixated in a number of specific desired longitudinal shape like a robotic finger. Thus the cleaning element cannot only be transferred from a compact inactive position towards an upright cleaning position, it is then also possible to have it adapted to and fixated in different cleaning positions, like fully straight or somewhat curved, in order to have it adapted to specific shapes of pairs of spectacles during cleaning. This may help to increase the cleaning efficiency.

In FIG. 12 a variant is shown in which the cleaning element 49 has a triangular shape with three flat sides. Thus the cleaning element is configured to get rotated stepwise by a turn mechanism over angles of 120 degrees during the respective phases of a cleaning operation. Two of the sides then can be covered with a first type of cleaning material, like for example a deep-pile cloth material, and one can be covered with a second type of cleaning material, like for example low-pile cloth material. Furthermore it can be seen in the partially cut-open section of FIG. 12 that the cleaning element comprises a rigid core 50, a compressible intermediate layer 51 and the cleaning materials on its three flat outer sides 52, 53 and 54.

FIG. 13 shows how two sets of three of the triangular cleaning elements 49 can be positioned adjacent each other with a pair of spectacles PoS placed over them in a fold-in state. For that the cross-sectional dimensions of the triangular cleaning elements 49 is chosen to be at least smaller than the width between the glasses G and the legs L of the pair of spectacles PoS when the legs L are in their fold-in state.

In FIG. 14-16 an alternative embodiment is shown for the delimitation of the cleaning elements 3a in the x- and y-directions. In this variant the interconnection strip is no longer necessary. Instead, in the upper flange part of the frame 30, six slots 60 are now provided. Those slots 60 inside the housing part 1b are configured to automatically take in the six upper ends of the rigid cores of the cleaning elements 3a inside the housing part 1a when the housing 1 gets closed. Thus again the cleaning elements 3a automatically get delimited in the x-direction in the closed housing position, whereas those cleaning elements 3a can easily be taken out and replaced by new ones in an open position of the housing. In the y-direction, the cleaning elements 3a are delimited with their cylindrical cleaning part in between the bearings 25 and plate elements 61 in which the slots 60 are provided.

Besides the embodiments shown numerous variants are possible. For example, the dimensions and shapes of the various elements may be changed. It is also possible to have the bar-shaped cleaning elements get to perform translational rubbing or wiping movements over the glasses while the pair of spectacles is held at a standstill. Instead of having the translation mechanism force two-dimensional translational movements upon either the pair of spectacles either the bar-shaped cleaning elements, it is also possible to have them force one-dimensional rubbing or wiping movements thereupon. Instead of having the cleaning elements get rotated stepwise in between one or more phases of a cleaning operation, it is also possible to have them constantly driven in rotation at certain speeds during part of or during the entire cleaning operation. The cleaning elements can be connected to their respective cleaning mechanism portions in various manners, preferably such that they can easily and quickly be replaced individually or as entire sets. Instead of the pinion-rack mechanism, other types of translation mechanisms can also be used, like for example one that forces the bar-shaped cleaning elements to slide like windscreen wipers over the glasses. Instead of the electromotor other types of drive units are also possible, including manually operable ones. Instead of or in addition to the bar-shaped cleaning elements being equipped with a compressible layer, it is also possible to have the entire cleaning elements biased in a direction perpendicular to the x-y plane towards the glasses. The translation mechanism can be configured to have the clamp mounting part follow the loop track in only one rotational direction. It is however also possible to have that rotational direction periodically turned around such that for example one or more clockwise translational movements get alternated with one or more anti-clockwise translational movements. A dozing/dispensing unit may be provided inside the housing for dispensing an attractive scent that may help to underline the quality of the cleaning operation and/or for dispensing some kind of cleaning liquid or drying air towards the glasses and/or cleaning elements during the cleaning operation. The housing can be made out of all kinds of materials, including all kinds of prints and logo's on it. It can also be made (partially) transparent such that it is clearly visible for users how the cleaning operation progresses. Since the housing is independent from the cleaning mechanism portions it can easily be varied in shape, material, etc. For example it can easily be made to fit inside a cup holder of a vehicle such that a pair of spectacles, like in particular sunglasses, not only can be cleaned with the device, but also can conveniently be stored therein without running a risk of getting smoothened or damaged when not being used.

Thus according to the invention an economic, compact and efficiently operating cleaning device is provided with which numerous pairs of spectacles can be carefully cleaned both by consumers as well as by professional users like opticians.

The invention claimed is:

1. A cleaning device for a pair of spectacles, comprising:
a housing defining a cleaning space;
a clamp for holding the pair of spectacles inside said space;
sets of opposing cleaning elements for cleaning opposing faces of glasses of the pair of spectacles; and
a motor for moving the pair of spectacles and the cleaning elements relative to each other during a cleaning operation;
in which the sets of opposing cleaning elements are positionable relative to each other between an inactive position, that is configured to have at least one of the sets of the cleaning elements lie spaced from at least one of the opposing faces of the respective glasses, and a cleaning position, that is configured to have the sets of opposing cleaning elements lie against both opposing faces of the respective glasses,
wherein each of the cleaning elements is bar-shaped,
wherein, in the cleaning position, each of the bar-shaped cleaning elements has a longitudinal axis that extends substantially parallel to the opposing faces of the glasses,
wherein the motor is configured to translate the pair of spectacles and the bar-shaped cleaning elements relative to each other substantially parallel to the opposing faces of the glasses while rubbing or wiping them clean,
wherein the motor operates a rack box that is slidable in a first direction, and a rack plate that is slidable in a second direction with respect to the rack box,
wherein the clamp for holding the pair of spectacles is connected to the rack plate or the bar-shaped cleaning elements are connected to the rack plate, and
wherein the motor is configured to force the rack box and the rack plate to start to translate in the first and second directions, respectively.

2. The cleaning device according to claim 1, wherein each of the cleaning elements is configured to be kept in one or more discrete rotation fixed positions around its own longitudinal axis during a cleaning operation such that each of the cleaning elements merely gets to exert a translational cleaning movement relative to the glasses.

3. The cleaning device according to claim 1, wherein each set of opposing cleaning elements comprises a plurality of bar-shaped cleaning elements that are positioned side-by-side.

4. The cleaning device according to claim 3, wherein each plurality of cleaning elements that are positioned side-by-side comprises cleaning elements having different cross-sectional dimensions.

5. The cleaning device according to claim 1, wherein the longitudinal axes of the bar-shaped cleaning elements, that extend substantially parallel to the opposing faces of the glasses, further extend in a direction from a lower side towards an upper side of the opposing faces of the glasses.

6. The cleaning device according to claim 1, wherein each of the cleaning elements has a cross-sectional dimension that is at least smaller than a free space between the glasses and legs of the pair of spectacles when the legs are in a fold-in state.

7. A cleaning device for a pair of spectacles, comprising:
a housing defining a cleaning space;
a clamp for holding the pair of spectacles inside said space;
sets of opposing cleaning elements for cleaning opposing faces of glasses of the pair of spectacles; and
a motor for moving the pair of spectacles and the cleaning elements relative to each other during a cleaning operation,
in which the sets of opposing cleaning elements are positionable relative to each other between an inactive position, that is configured to have at least one of the sets of the cleaning elements lie spaced from at least one of the opposing faces of the respective glasses, and a cleaning position, that is configured to have the sets of opposing cleaning elements lie against both opposing faces of the respective glasses,
wherein each of the cleaning elements is bar-shaped,
wherein, in the cleaning position, each of the bar-shaped cleaning elements has a longitudinal axis that extends substantially parallel to the opposing faces of the glasses,
wherein the motor is configured to translate the pair of spectacles and the bar-shaped cleaning elements relative to each other substantially parallel to the opposing faces of the glasses while rubbing or wiping them clean,
wherein each of the bar-shaped cleaning elements is rotatable stepwise around its longitudinal axis, for having different sections of the bar-shaped cleaning elements come to lie against the opposing faces of the respective glasses during subsequent phases of the cleaning operation, and
wherein the different sections of the bar-shaped cleaning elements are equipped with different types of cleaning materials for use during the subsequent phases of the cleaning operation.

8. The cleaning device according to claim 7, wherein a first type of cleaning material is configured for a starting phase of the cleaning operation, and wherein a second type of cleaning material is configured for a finishing phase of the cleaning operation.

9. The cleaning device according to claim 8, wherein the first type of cleaning material is a first pile cloth material, and wherein the second type of cleaning material is a second pile cloth material, wherein the first cloth material has a deeper pile than the second cloth material.

10. The cleaning device according to claim 7, wherein the motor that is configured for translating the pair of spectacles and the bar-shaped cleaned elements relative to each other is further configured to rotate the bar-shaped cleaning elements stepwise periodically after a pre-set number of translations of the pair of spectacles and the bar-shaped cleaning elements relative to each other have been performed.

11. A cleaning device for a pair of spectacles, comprising:
a housing defining a cleaning space;
a clamp for holding the pair of spectacles inside said space;
sets of opposing cleaning elements for cleaning opposing faces of glasses of the pair of spectacles; and
a motor for moving the pair of spectacles and the cleaning elements relative to each other during a cleaning operation, in which the sets of opposing cleaning elements are positionable relative to each other between an inactive position, that is configured to have at least one of the sets of the cleaning elements lie spaced from at least one of the opposing faces of the respective glasses, and a cleaning position, that is configured to have the sets of opposing cleaning elements lie against both opposing faces of the respective glasses, wherein each of the cleaning elements is bar-shaped, wherein, in the cleaning position, each of the bar-shaped cleaning elements has a longitudinal axis that extends substantially parallel to the opposing faces of the glasses, wherein the motor is configured to translate the pair of spectacles and the bar-shaped cleaning elements relative to each other substantially parallel to the opposing faces of the glasses while rubbing or wiping them clean, wherein the motor is configured to translate the pair of spectacles and the bar-shaped cleaning elements relative to each other substantially parallel to the opposing faces of the glasses while following a closed-loop track with up and down and back and forth trajectories.

12. A method for a pair of spectacles using the cleaning device according to claim 1, comprising the steps:

placing the pair of spectacles onto the clamp inside the cleaning space defined by the housing while at least one of the sets of the cleaning elements is spaced from at least one of the opposing faces of the respective glasses;

positioning the sets of opposing bar-shaped cleaning elements relative to each other from their inactive position towards their cleaning position, wherein the sets of opposing cleaning elements lie against both opposing faces of the respective glasses and wherein the longitudinal axis of each of bar-shaped cleaning elements extend substantially parallel to the opposing faces of the glasses; and causing the motor to translate the pair of spectacles and the bar-shaped cleaning elements relative to each other substantially parallel to the opposing faces of the glasses while rubbing or wiping them clean.

13. The method according to claim 12, wherein the cleaning elements are kept in one or more discrete rotational fixed positions during a cleaning operation such that they merely get to exert a translational cleaning movement relative to the glasses while the motor translates the pair of spectacles and the bar-shaped cleaning elements relative to each other substantially parallel to the opposing faces of the glasses wile rubbing or wiping the glasses clean.

14. A cleaning device for a pair of spectacles, comprising:
a housing defining a cleaning space;
a clamp for holding the pair of spectacles inside said space;
sets of opposing cleaning elements for cleaning opposing faces of glasses of the pair of spectacles; and
a motor for moving the pair of spectacles and the cleaning elements relative to each other during a cleaning operation,
in which the sets of opposing cleaning elements are attached to the housing and are positionable relative to each other between an inactive position, that is configured to have one of the sets of the cleaning elements lie spaced from the glasses, and a cleaning position, that is configured to have the sets of opposing cleaning elements contact the opposing faces of the glasses, wherein the housing is in an opened position when the sets of opposing cleaning elements are in the inactive position and the housing is in a closed position when the sets of opposing cleaning elements are in the cleaning position, wherein each of the cleaning elements of the sets of opposing cleaning elements is bar-shaped, wherein, in the cleaning position, a longitudinal axis of at least one of the bar-shaped cleaning elements of the sets of opposing cleaning elements extends substantially parallel to the opposing faces of the glasses, and wherein the motor is configured to translate the pair of spectacles in multiple directions while the glasses are in contact with the sets of opposed cleaning elements.

15. The cleaning device according to claim 14, wherein each of the cleaning elements of the sets of cleaning elements is configured to be kept in one or more discrete rotation fixed positions around a longitudinal axis during a cleaning operation such that the cleaning elements exert translational cleaning movement relative to the glasses.

16. The cleaning device according to claim 14, wherein the motor operates a rack box that is slidable in a first direction, and a rack plate that is slidable in a second direction that is different from the first direction, wherein the clamp for holding the pair of spectacles is connected to the rack plate or the bar-shaped cleaning elements are connected to the rack plate, and wherein the motor is configured to force the rack box and rack plate to start to translate in the first and second directions.

17. The cleaning device according to claim 14, wherein each of the bar-shaped cleaning elements is rotatable stepwise around a longitudinal axis such that different sections of the bar-shaped cleaning elements come to lie against the opposing faces of the respective glasses during subsequent phases of the cleaning operation.

18. The cleaning device according to claim 17, wherein the different sections of the bar-shaped cleaning elements are equipped with different types of cleaning materials for use during the subsequent phases of the cleaning operation.

19. The cleaning device according to claim 18, wherein a first type of cleaning material is configured for a starting phase of the cleaning operation, and wherein a second type of cleaning material is configured for a finishing phase of the cleaning operation.

20. The cleaning device according to claim 19, wherein the first type of cleaning material is a first cloth material, and wherein the second type of cleaning material is a second cloth material, and wherein the first cloth material has a deeper pile than the second cloth.

21. The cleaning device according to claim 20, wherein the motor that is configured for translating the pair of spectacles is further configured to rotate the bar-shaped cleaning elements stepwise periodically after a pre-set number of translations of the pair of spectacles has been performed.

22. The cleaning device according to claim 14, wherein each set of opposing cleaning elements comprises a plurality of bar-shaped cleaning elements that are positioned side-by-side.

23. The cleaning device according to claim 22, wherein each plurality of cleaning elements that are positioned side-by-side comprises cleaning elements having different cross-sectional dimensions.

24. The cleaning device according to claim 14, wherein the longitudinal axis of each of the at least one of the bar-shaped cleaning elements that extends in a direction substantially parallel to the opposing faces of the glasses also extends in a direction from a lower side toward an upper side of the opposing faces of the glasses.

25. The cleaning device according to claim 14, wherein each of the cleaning elements has a cross-sectional dimension that is at least smaller than a free space between the glasses and legs of the pair of spectacles when the legs are in a fold-in state.

26. The cleaning device according to claim 14, wherein the motor is configured to translate the pair of spectacles substantially parallel to the opposing faces of the glasses while following a two-dimensional track.

27. A method for cleaning the pair of spectacles using the cleaning device according to claim 14, comprising the steps:
- placing the pair of spectacles onto the clamp inside the cleaning space defined by the housing while at least one of the sets of the cleaning elements is spaced from at least one of the glasses;
- positioning the sets of opposing bar-shaped cleaning elements in their cleaning position such that the longitudinal axis of at least one of the bar-shaped cleaning elements extends substantially parallel to the opposing faces of the glasses; and
- having the motor translate the pair of spectacles substantially parallel to the opposing faces of the glasses while rubbing or wiping the glasses clean.

28. The method according to claim 27, wherein the cleaning elements are kept in one or more discrete rotational fixed positions during a cleaning operation such that the cleaning elements exert a translational cleaning movement relative to the glasses while the motor translates the pair of spectacles substantially parallel to the opposing faces of the glasses while rubbing or wiping the glasses clean.

* * * * *